(12) United States Patent
Schartinger et al.

(10) Patent No.: US 6,205,895 B1
(45) Date of Patent: Mar. 27, 2001

(54) INTERNAL ROTARY TUBE CUTTER

(75) Inventors: Edward J. Schartinger, Cavan; Terry Hunter, Peterborough, both of (CA)

(73) Assignee: General Electric Canada Inc., Mississauga (CA)

(*) Notice: Subject to any disclaimer, the term of this patent is extended or adjusted under 35 U.S.C. 154(b) by 0 days.

(21) Appl. No.: 08/763,811

(22) Filed: Dec. 10, 1996

(51) Int. Cl.$^7$ ........................................ B23B 5/14
(52) U.S. Cl. ..................... 82/47; 82/58; 82/113; 82/158
(58) Field of Search ................. 82/113, 47, 58, 82/61, 64, 84, 83, 82, 85, 101, 70.1, 157, 158, 123; 408/80, 82, 83

(56) References Cited

U.S. PATENT DOCUMENTS 3,848,489 * 11/1974 Santana ...................................... 82/61
4,758,121 * 7/1988 Kwech ................................ 82/113 X

FOREIGN PATENT DOCUMENTS

2559145 * 7/1977 (DE) ........................................ 408/82

* cited by examiner

Primary Examiner—Andrea L. Pitts
Assistant Examiner—Henry W. H. Tsai
(74) Attorney, Agent, or Firm—Edward H Oldham

(57) ABSTRACT

A tube cutter designed for cutting a pipe where access is limited to the interior of the tube only. A rotatable cutter head mounted at the end of an elongated drive shaft carries a plurality of cuffing wheels. The tube cutter is inserted into a tube to be cut from one end thereof using the elongated drive shaft to position the cutter head in the tube. When the cutter head is inserted into the predetermined location, a feed drive is energized which rotates a scroll head to cause the cutting wheels to move in a radial direction to advance and engage the interior surface of the tube in a concentric manner undergoing cutting. When the tube has been severed, the feed drive rotation is reversed to retract the cutting wheels into the rotatable head, so as to enable removal of the rotary tube cutter from the tube.

13 Claims, 2 Drawing Sheets

INTERNAL ROTARY TUBE CUTTER

BACKGROUND OF THE INVENTION

This invention relates to a device useful in cutting tubes or pipes in locations that make it impossible to cut the pipe from the outside. At times, it is necessary to remove tubes from boilers, reactors, etc. where the only available access to the tube is at one end of the boiler reactor, etc. and this access is limited to the interior of the tube diameter.

Prior art devices have included various types of cutting devices which at times have had performance limitations which caused problems in obtaining the desired result.

The cutting device must be insertable into the interior of the tube from the end thereof, and must be able to reach the desired cutting location which may be a substantial distance from the end of the boiler or reactor from which the cutter has been inserted.

The cutter will preferably not produce any shavings or other particles of a nature that might be produced by grinding, filing or otherwise abrading the pipe undergoing cutting.

Similarly, the device must not permanently distort the tube undergoing cutting or produce any deflections of a permanent nature in the tube which would impair its future use.

The cutting device must be easy to insert into the tube, and be actuable from the end of the reactor or boiler to produce an acceptable separation of the tube, and the cutting device must be capable of being retracted from the tube when the cutting operation is complete.

Prior art devices have included devices which carry a single or a pair of oppositely disposed cutter wheels mounted in a rotating head of a cutting device.

Such a cutting device is driven by a hollow shaft to produce rotation of the head, and a second co-axial shaft is provided within the hollow shaft which is connected to ramping surfaces associated with the cutter wheels so that translation of the co-axial shaft causes the ramping surfaces to move the cutter wheels into engagement with the pipe and perform the desired operation. This device tends to distort the tube undergoing the cutting operation so that the metallurgical properties of the tube may have been altered in the region where the cutting operation has taken place.

A good example of a prior art inside pipe and tube cutter may be found in U.S. Pat. No. 2,814,105 to Smith. This patent describes a pipe cutting device having two oppositely disposed cutting wheels, which are adjustable in a radial direction to produce a rotary cut inside a pipe. The device is intended to be used for producing cuts in pipes at a location near the end of the pipe.

Because the device is intended to cut cast iron soil pipes, the axes of the cutting device need not be stabilized in the pipe at the lower end, thus, the cutter wheels may cause the axis of the device to nutate, and if the device is employed for severing ductile pipe, the distoration of the pipe during the severing operation may not be acceptable.

U.S. Pat. No. 4,424,629 to Schott shows a very complex device useful in severing boiler tubes from the inside of the tube. The device is centered in the tube by a pair of eccentric guide rolls and a single hydraulically actuated cutter wheel is advanced to cut the tube during rotation of the tool.

The distortion produced by this device cannot be overemphasized, and the complexity of the device is sufficient to make the device uneconomical to manufacture. The limit of travel allowed for the cutting wheel confines the use of this device to a small range of pipes or tubes.

SUMMARY OF THE INVENTION

This cutting device (somewhat torpedo shaped) utilizes a plurality of co-planar cutter wheels (preferably 6) mounted in a rotating head which are radially movable, so as to move in concert in a manner similar to the jaws of a three jaw chuck of a lathe, to produce a circular cut in a tube with a minimum of tube distortion. A hollow drive tube produces the necessary rotational force to drive the cutting head. A second co-axial tube is rotated relative to the driving tube to advance or retract the cutter wheels in concert. A bearing in the cutting head provides a stationary contact between the rotating head and that portion of the tube which ultimately remains behind in the reactor so as to reduce surface imperfections to the interior of the tube produced during the cutting operation.

DESCRIPTION OF THE PREFERRED EMBODIMENT

Figure 1:
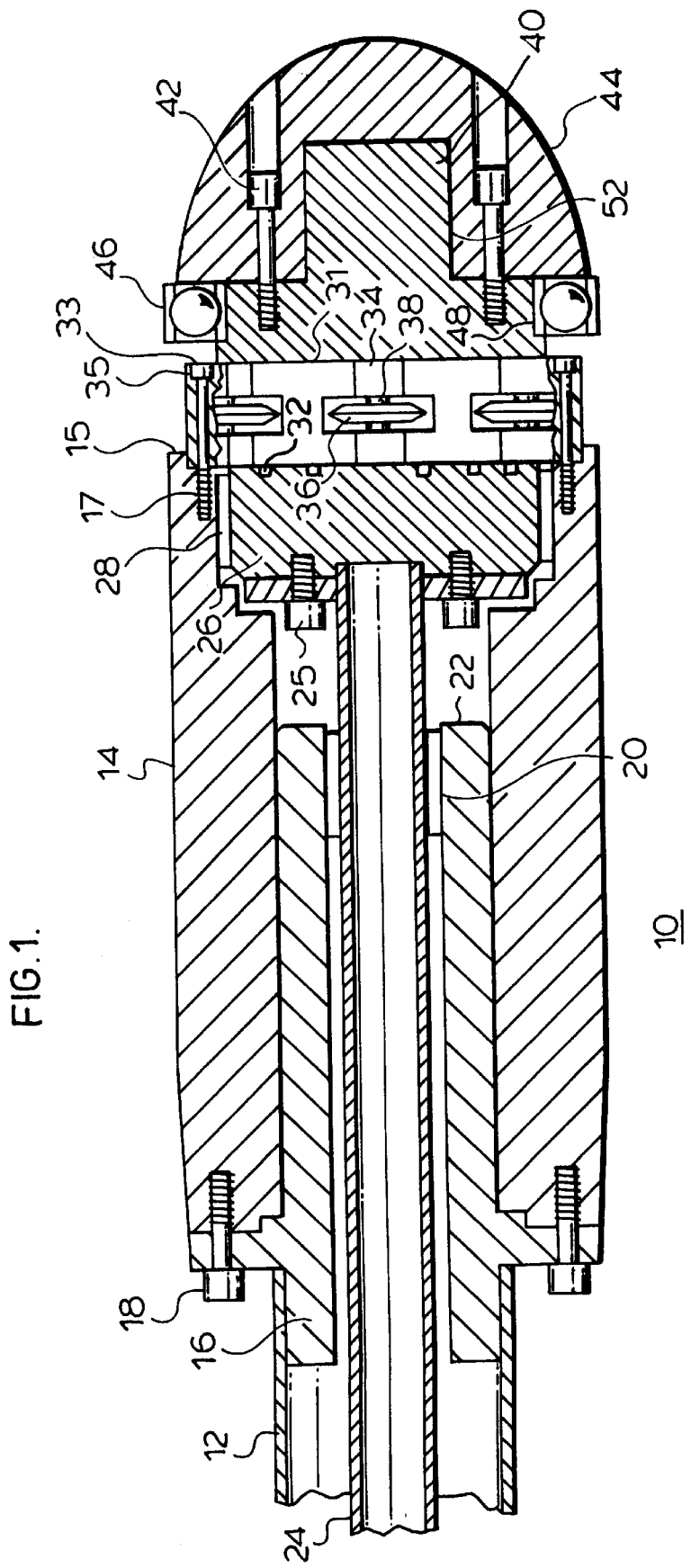
FIG. 1 is a cross sectional view of the cutting device of this invention.
Figure 2:
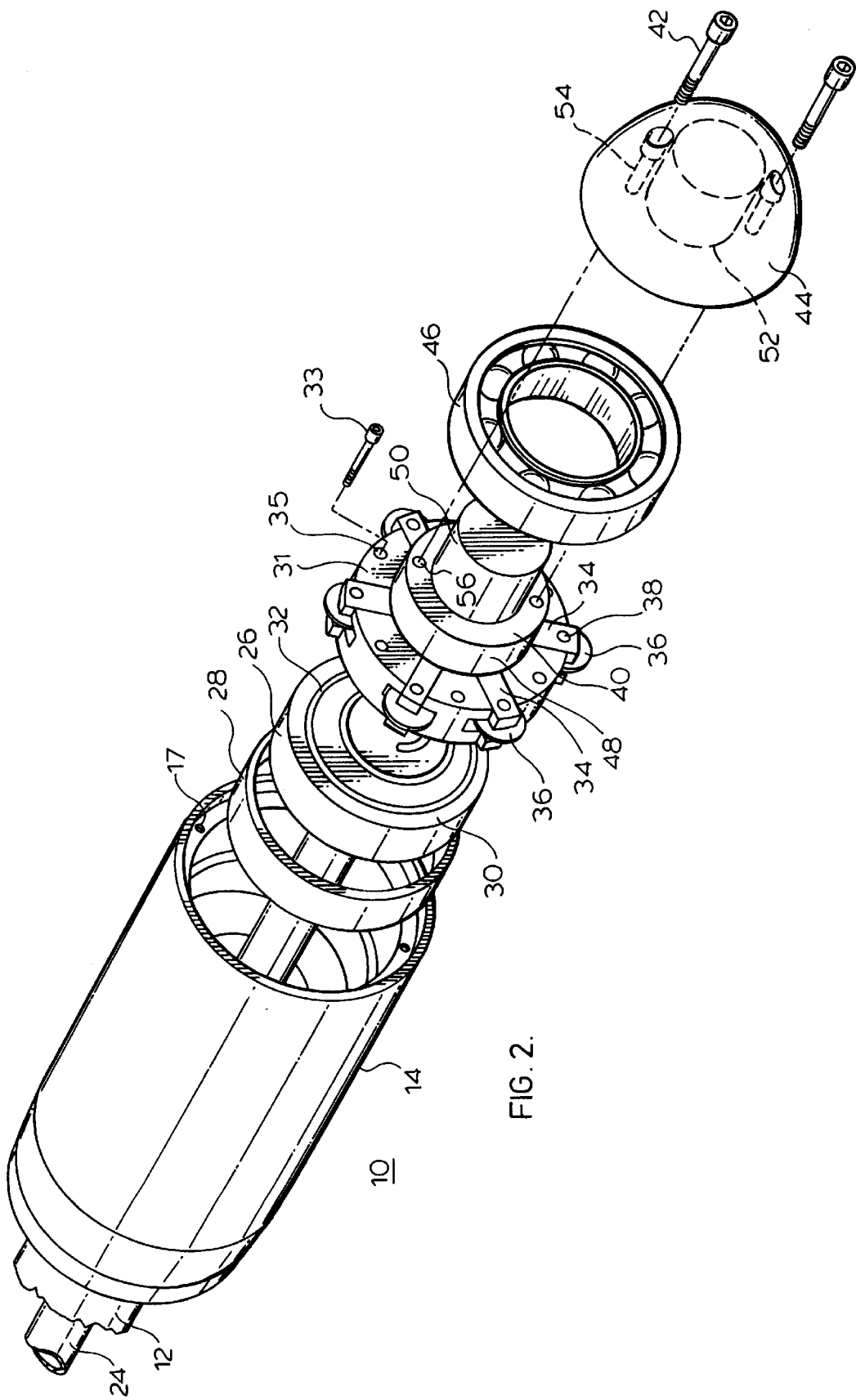
FIG. 2 is an exploded view of the device of FIG. 1.

FIG. 1 shows a rotating head 10 which is driven by a hollow shaft 12. Hollow shaft 12 is fixedly attached to body 14 by means of intermediate bearing carrier 16. Carrier 16 is attached to body 14 by means of suitable fastening means, in this instance bolts 18.

Bearing carrier 16 extends within body 14 and carries a sleeve bearing 20 adjacent the end 22 of bearing carrier 16.

Body 14 is provided with an annular surface 15 inside of which a series of spaced threaded holes 17 are located.

Mounted within body 14 and suitably journalled in bearing 20 is a second hollow shaft 24 which is rotatable relative to shaft 12.

Shaft 24 is fastened by means of bolts 25 to a cylindrically shaped member 26 which is rotatably mounted in body 14 in a suitable bearing 28. Member 26 may be rotated within body 14 by shaft 24.

The circular face 30 of the member 26 is provided with a scroll thread 32 similar to the scroll found in a three jaw lathe chuck.

A cutter wheel carrier 31 is mounted on the end of head 14 by means of screws 33 mounted in holes 35, which ultimately seat in threaded holes 17.

Mounted within carrier 31 in this instance are six jaws, one of which is shown as 34. Jaws 34 are mounted in carrier 31 and are provided with grooved threads to mate with scroll thread 32 and are moved radially when scroll member 26 is rotated. Six cutting wheels are ideal for minimizing distortion of the tube undergoing cutting. One wheel will produce a tube cut if time is not of paramount importance in the cutting operation.

Each jaw 34 carries a rotatable cutting wheel 36 mounted on suitable journal members 38. The cutting wheels 36 are standard "off the shelf" cutter wheels used in such devices as commercial pipe cutters, etc.

A bearing and nose cone support member 40 is mounted on the face of cutter wheel carrier 31 by means of screws 42 in nose cone 44. A bearing 46 of slightly larger diameter than body 14 is mounted on bearing support 48 of member 40.

A cylindrical nose cone mounting surface 50 is formed on member 40. The surface 50 protrudes into cylindrical recess 52 of nose cone 44 in a sliding fit.

In operation head 10 is inserted into a tube to a point where the severing of the tube is to take place. The distance may be substantial in the order of several feet. At the predetermined location, the location of hollow drive shaft 12 is fixed (fixing the location of head 10) and shafts 12 and 24 are rotated in synchronism to initiate rotation of head 10.

When cutting is to begin, shaft 24 is rotated with respect to shaft 12 to rotate scroll member 26 with respect to body 14. Provided that relative rotation of shaft 24 is in the proper sense, jaws 34 will advance outwardly of body 14 in concert to engage the surface of the tube to be severed in such a manner as to cause tool 10 to remain concentric in the tube during the cutting operation. Relative rotation of shaft 24 with respect to shaft 12 continues to advance the cutter wheels until the tube is severed.

Jaws 34 and cutter wheels 36 may now be retracted by producing the opposite relative motion of shaft 24 with respect to shaft 12. When the jaws and cutter wheels have been retracted, the device 10 may be removed from the severed pipe.

It will be found that the use of the device 10 is simple and easy to control, a definite asset when controlling a tool remotely. The head 10 is equi-centering in the tube, thus eliminating unnecessary stresses caused by excessive epicyclodial movement of the head 10 during a cutting operation.

Because of the presence of a large number of equidistantly spaced cutting wheels, tube distortion is reduced to a minimum, and each wheel is not required to take a large "bite". No shavings from the tube cut need be produced.

Because of the additional stabilization of the head in the tube provided by bearing 44, any fracture of a cutting wheel 36 in the head 10 during a cutting operation may be dealt with without interruption of the cutting operation. This feature is extremely important when severing a pressure tube in a nuclear reactor at a location several feet from the accessible end of the tube.

Obvious changes to the construction of applicant's device will become apparent to those skilled in the art, however, applicant prefers to limit the ambit of protection for this invention by the scope of the following claims.

What is claimed is:

1. An apparatus for producing an internal circular cut in a tube at a distance remote from an open end thereof comprising:
    a substantially torpedo shaped body and having a size which will permit said body to be inserted into the tube to be cut,
    drive means connected to said body for rotating said body about its axis from a location remote from said body,
    at least three co-planar equidistantly spaced cutter wheels mounted in said body and being rotatable therewith, said wheels also being radially movable in concert in said body to contact and cut said tube at a predetermined location in the interior of said tube,
    feed means associated with said drive means to cause radial outward or inward movement of said cutter wheels in said body.

2. Apparatus as claimed in claim 1 wherein said drive means comprises a hollow drive shaft attached to an end of said body, and said feed means comprises a second drive shaft mounted within said hollow drive shaft and attached to said body.

3. Apparatus as claimed in claim 2 wherein said feed means is connected to a scroll wheel mounted for rotation within said body.

4. Apparatus as claimed in claim 3 wherein at least three jaws are mated to said scroll wheel in said body, said jaws being restricted to movement in concert in a radial direction in said body in response to rotational movement of said feed means.

5. Apparatus as claimed in claim 4 wherein each jaw has a cutter wheel mounted therein to protrude radially outwardly of each jaw.

6. Apparatus as claimed in claim 5 wherein said body carries suitable bearing means to stabilize said body in said tube under extraordinary cutting conditions.

7. An apparatus for producing a remote internal circular cut in a tube comprising:
    a torpedo shaped body having a nose section at one end thereof, a first hollow drive shaft attached to said body remote from said nose section for producing rotation of said body within said tube, said body having a bearing means mounted on said body for contacting said tube for stabilizing said body in said tube during rotation of said body,
    at least three co-planar equidistantly spaced cutting wheels mounted in said body for rotation therewith, and being movable outwardly or inwardly in concert in a radial direction to simultaneously contact and cut said pipe when activated by suitable cutter wheel activation means.

8. Apparatus as claimed in claim 7 wherein said cutter wheel activation means comprises a scroll wheel driven by a second drive shaft mounted in co-axial relationship with said first hollow drive shaft.

9. Apparatus as claimed in claim 8 wherein each cutter wheel is mounted on a sliding jaw for executing radial motion within said body, such that the cutter wheel is mounted for rotation in said jaw and protrudes radially beyond said jaw.

10. Apparatus as claimed in claim 9 wherein each jaw is mated to said scroll wheel mounted for rotation within said body.

11. A method of producing a circular internal cut in a tube at a remote location comprising:
    providing a torpedo shaped body having a pair of hollow co-axial drive shafts attached to one end of said body,
    inserting said body into said tube from one end of said tube,
    rotating said body in said tube by applying a torque to one of said pair of drive shafts,
    rotating the other drive shaft of said pair to advance at least three equidistantly spaced cutter wheels mounted in sliding means in said body to move in concert to engage said tube and cut said tube,
    rotating said other drive shaft to retract said cutter wheels into said body and withdrawing said body from said tube.

12. A method as claimed in claim 11 providing a scroll wheel within said body, connecting said scroll wheel to said other drive shaft to move said cutter wheels in a radial direction within said body.

13. A method as claimed in claim 12 providing centering means on said body adjacent said cutting wheels, activating said centering means to guide said body if said body becomes uncentered.

* * * * *